US007284454B2

(12) United States Patent
Cote

(10) Patent No.: US 7,284,454 B2
(45) Date of Patent: Oct. 23, 2007

(54) HAND HELD PIPETTE

(75) Inventor: Richard Cote, Sudbury, MA (US)

(73) Assignee: Matrix Technologies Corporation, Hudson, NH (US)

( * ) Notice: Subject to any disclaimer, the term of this patent is extended or adjusted under 35 U.S.C. 154(b) by 169 days.

(21) Appl. No.: 10/855,690

(22) Filed: May 27, 2004

(65) Prior Publication Data

US 2005/0262951 A1 Dec. 1, 2005

(51) Int. Cl.
*G01N 1/00* (2006.01)

(52) U.S. Cl. .................................................... 73/864.18

(58) Field of Classification Search ............. 73/864.18, 73/864.13; 422/100; 436/180
See application file for complete search history.

(56) References Cited

U.S. PATENT DOCUMENTS 3,142,719 A 7/1964 Farr
3,197,285 A 7/1965 Rosen
3,558,014 A 1/1971 Wood et al.
3,732,735 A 5/1973 Cohen
3,754,687 A 8/1973 Norton
3,767,364 A 10/1973 Ritchie et al.
3,769,178 A 10/1973 Rothermel, Jr.
3,786,683 A 1/1974 Berman et al.
3,827,305 A 8/1974 Gilson et al.
3,853,012 A 12/1974 Scordato et al.
3,915,651 A 10/1975 Nishi
3,918,308 A 11/1975 Reed
3,933,048 A 1/1976 Scordato
3,954,014 A 5/1976 Andrews, Jr. et al.
3,991,617 A 11/1976 Marteau d'Autry
4,009,611 A 3/1977 Koffer et al.
4,061,037 A 12/1977 Keegan (Continued)

FOREIGN PATENT DOCUMENTS

EP 0737515 12/2001

(Continued)

OTHER PUBLICATIONS

"A Fast and Low-Volume Pipettor with Integrated Sensors for High Precision," 2000 IEEE, pp. 409-413.

(Continued)

*Primary Examiner*—Robert Raevis
(74) *Attorney, Agent, or Firm*—Wood, Herron & Evans, LLP

(57) ABSTRACT

A hand-held pipette includes a piston driven by an actuator assembly contained within a housing having first and second mutually spaced non-adjustable stops. The actuator assembly is subdivided into first and second sections respectively provided with first and second contact surfaces. The actuator assembly is arranged to reciprocate between a rest position at which the first contact surface is in contact with the first stop and the second contact surface is spaced from the second stop by a control distance, and an advanced position at which the second contact surface is in contact with the second stop and the first contact surface is spaced from the first stop, with the stroke of the actuator assembly and the stroke of the piston being equal to the control distance. A motor-driven mechanism is arranged to displace one section of the actuator assembly relative to the other section, resulting in a corresponding change to both the overall length of the actuator assembly and the control distance.

32 Claims, 10 Drawing Sheets

U.S. PATENT DOCUMENTS

| | | | | | |
|---|---|---|---|---|---|
| 4,096,751 | A | * | 6/1978 | Withers et al. | 73/864.18 |
| 4,151,750 | A | | 5/1979 | Suovaniemi et al. | |
| 4,164,870 | A | | 8/1979 | Scordato et al. | |
| 4,197,735 | A | | 4/1980 | Munzer et al. | |
| 4,257,267 | A | | 3/1981 | Parsons | |
| 4,283,950 | A | | 8/1981 | Tervamaki | |
| 4,345,483 | A | | 8/1982 | Paletta et al. | |
| 4,369,665 | A | | 1/1983 | Citrin | |
| 4,399,711 | A | | 8/1983 | Klein | |
| 4,399,712 | A | | 8/1983 | Oshikubo et al. | |
| 4,433,795 | A | | 2/1984 | Maiefski et al. | |
| 4,470,317 | A | | 9/1984 | Sabloewski et al. | |
| 4,475,666 | A | * | 10/1984 | Bilbrey et al. | 222/14 |
| 4,489,618 | A | | 12/1984 | Meyer | |
| 4,517,850 | A | | 5/1985 | Wiseman et al. | |
| 4,519,258 | A | | 5/1985 | Jakubowicz | |
| 4,563,907 | A | | 1/1986 | Johnson, Jr. et al. | |
| 4,567,780 | A | | 2/1986 | Oppenlander et al. | |
| 4,586,546 | A | | 5/1986 | Mezei et al. | |
| RE32,210 | E | | 7/1986 | D'Autry | |
| 4,616,514 | A | | 10/1986 | Magnussen, Jr. et al. | |
| 4,671,123 | A | | 6/1987 | Magnussen et al. | |
| 4,763,535 | A | | 8/1988 | Rainin et al. | |
| 4,790,176 | A | | 12/1988 | Marteau d'Autry | |
| 4,801,434 | A | | 1/1989 | Kido et al. | |
| 4,821,586 | A | | 4/1989 | Scordato et al. | |
| 4,824,642 | A | | 4/1989 | Lyman et al. | |
| 4,896,270 | A | | 1/1990 | Kalmakis et al. | |
| 4,909,991 | A | | 3/1990 | Oshikubo | |
| 4,965,050 | A | | 10/1990 | Jessop | |
| 4,967,604 | A | | 11/1990 | Arpagaus et al. | |
| 4,988,481 | A | | 1/1991 | Jarvimaki et al. | |
| 4,995,532 | A | | 2/1991 | Knodel | |
| 4,999,164 | A | | 3/1991 | Puchinger et al. | |
| 5,002,737 | A | | 3/1991 | Tervamaki | |
| 5,012,682 | A | | 5/1991 | Sabloewski et al. | |
| 5,018,394 | A | | 5/1991 | Gilson | |
| 5,090,255 | A | | 2/1992 | Kenney | |
| 5,104,625 | A | | 4/1992 | Kenney | |
| 5,174,961 | A | * | 12/1992 | Smith | 422/73 |
| 5,187,990 | A | | 2/1993 | Magnussen, Jr. et al. | |
| 5,192,511 | A | | 3/1993 | Roach | |
| 5,320,810 | A | | 6/1994 | Al-Mahareeq et al. | |
| 5,343,769 | A | | 9/1994 | Suovaniemi et al. | |
| 5,347,878 | A | | 9/1994 | Suovaniemi | |
| 5,364,596 | A | | 11/1994 | Magnussen, Jr. et al. | |
| 5,389,341 | A | | 2/1995 | Tuunanen et al. | |
| 5,403,553 | A | | 4/1995 | Heinonen | |
| 5,406,856 | A | | 4/1995 | Kuhn | |
| 5,435,197 | A | | 7/1995 | Telimaa et al. | |
| 5,481,900 | A | | 1/1996 | Husar | |
| 5,505,097 | A | | 4/1996 | Suovaniemi et al. | |
| 5,511,433 | A | | 4/1996 | Sabloewski et al. | |
| 5,531,131 | A | | 7/1996 | Sabloewski | |
| 5,573,729 | A | | 11/1996 | Belgardt et al. | |
| 5,591,408 | A | | 1/1997 | Belgardt et al. | |
| 5,611,784 | A | | 3/1997 | Barresi et al. | |
| 5,614,153 | A | | 3/1997 | Homberg | |
| 5,620,660 | A | | 4/1997 | Belgardt et al. | |
| 5,620,661 | A | | 4/1997 | Schurbrock | |
| 5,696,330 | A | | 12/1997 | Heinonen | |
| 5,807,524 | A | | 9/1998 | Kelly et al. | |
| 5,844,686 | A | | 12/1998 | Treptow et al. | |
| 5,849,248 | A | | 12/1998 | Homberg | |
| 5,970,806 | A | | 10/1999 | Telimaa et al. | |
| 5,983,733 | A | | 11/1999 | Strandberg et al. | |
| 5,998,218 | A | | 12/1999 | Conley et al. | |
| 6,074,611 | A | | 6/2000 | Flesher | |
| 6,090,348 | A | | 7/2000 | Steele et al. | |
| 6,133,045 | A | | 10/2000 | Johnson et al. | |
| 6,158,292 | A | | 12/2000 | Gilson et al. | |
| 6,168,761 | B1 | | 1/2001 | Kelly et al. | |
| 6,170,343 | B1 | | 1/2001 | Conley et al. | |
| 6,171,553 | B1 | | 1/2001 | Petrek | |
| 6,182,719 | B1 | | 2/2001 | Yahiro | |
| 6,197,259 | B1 | | 3/2001 | Kelly et al. | |
| 6,199,435 | B1 | | 3/2001 | Wilmer et al. | |
| 6,248,295 | B1 | | 6/2001 | Petrek | |
| 6,249,717 | B1 | | 6/2001 | Nicholson et al. | |
| 6,254,826 | B1 | | 7/2001 | Acosta et al. | |
| 6,254,832 | B1 | | 7/2001 | Rainin et al. | |
| 6,295,880 | B1 | | 10/2001 | Gilson | |
| 6,324,925 | B1 | | 12/2001 | Suuvaniemi et al. | |
| 6,428,750 | B1 | * | 8/2002 | Rainin et al. | 422/100 |
| 6,532,837 | B1 | | 3/2003 | Magnussen et al. | |
| 6,601,433 | B2 | | 8/2003 | Kriz et al. | |
| 6,715,369 | B2 | | 4/2004 | Baba et al. | |
| 2002/0001545 | A1 | | 1/2002 | Cronenberg et al. | |
| 2002/0020233 | A1 | | 2/2002 | Baba et al. | |
| 2003/0099578 | A1 | * | 5/2003 | Cote et al. | 422/100 |

FOREIGN PATENT DOCUMENTS

| | | |
|---|---|---|
| FR | 2071052 | 9/1971 |
| JP | 03186353 | 8/1991 |
| WO | WO91/05609 | 5/1991 |
| WO | WO 01/57490 | 8/2001 |
| WO | WO 02/00345 | 1/2002 |
| WO | WO03/033151 | 4/2003 |

OTHER PUBLICATIONS

"The Automatic Pipette," American Diagnostica, May 2001.

Handi-Pet Pipetting Gun, General Diagnostics, Mar. 1973.

Eppendorf EDOS 5221, Instructions Manual, Eppendorf, Germany, no date.

* cited by examiner

HAND HELD PIPETTE

BACKGROUND OF THE INVENTION

1. Field of the Invention

This invention relates generally to hand-held pipettes employing axially reciprocating pistons to aspirate and dispense fluids into and out of replaceable pipette tips, and is concerned in particular with an improved actuator assembly and associated system for automatically controlling the stroke of such pistons.

2. Description of the Prior Art

Hand-held pipettes with manually driven pistons and automatic stroke control mechanisms have been known for nearly a decade. FIG. 14 illustrates one such pipette 10 developed in 1994 by engineering students at Northeastern University in Boston, Mass. The pipette 10 includes a piston 12 having its lower end received within a cylinder 14 configured at its distal end to accept a pipette tip (not shown). The piston 12 is acted upon by a manually operable plunger shaft 16. A collar 18 on the plunger shaft is resiliently urged against a rear stop 20 by a spring 22 acting on the piston 12. The piston is advanced into the cylinder 14 by manually depressing the plunger shaft 16 against the biasing action of the spring 22. A forward stop 24 is engageable by the collar 18 to limit the extent to which the plunger shaft can be depressed. The piston stroke "S" is thus defined by the distance between the forward and rear stops 20, 24.

The rear stop 20 forms part of a frame 26 slidably mounted on a guide shaft 28 supported by the housing in parallel relationship to the plunger shaft 16. A stepper motor 30 has its output screw shaft 32 threaded through an upper part of the frame 26. The motor is operable to automatically shift the frame 26 along the guide shaft 28, resulting in a corresponding adjustment of the rear stop 20 and a corresponding adjustment to the stroke of the piston 12.

One problem with this type of automatic stroke adjustment is that when advancing the rear stop 20 towards the forward stop 24 in order to reduce the length of the piston stroke, the motor 30 must work against a gradually increasing biasing force being exerted by the spring 22. Thus, the motor either must be sized large enough to overcome this biasing force, or the plunger shaft 16 must be depressed to unload the rear stop prior to making any stroke adjustment. Larger motors contribute disadvantageously to the size and cost of the unit, whereas the need to preliminarily unload the rear stop unduly complicates the stroke adjustment sequence. Larger motors also consume more power, thus requiring larger batteries, which further adds to the size and weight of the unit.

Another problem stems from the fact that the initial or "starting" force required to depress the plunger shaft 16 will vary, depending on the extent to which the spring 22 has been compressed in response to prior adjustments of the rear stop 20. Such variations in starting force can distract laboratory personnel from the task of precisely aspirating and dispensing fluids.

The parallel arrangement of the plunger shaft 16 and motor output shaft 32 also contributes disadvantageously to the overall size of the housing and hence the weight of the unit, making it more expensive to manufacture and less convenient to use.

The present invention has as its overall objective the provision of a hand-held manually-driven pipette incorporating an improved stroke adjustment mechanism that obviates or at least substantially minimizes the above described problems.

SUMMARY OF THE INVENTION

In accordance with the present invention, a hand-held pipette includes a housing provided with a chamber and internal mutually spaced first and second stops. A replaceable pipette tip is arranged in fluid communication with the chamber, and a reciprocating piston coacts with the chamber to aspirate and dispense fluids into and out of the pipette tip. An actuator assembly is operable to reciprocate the piston. The actuator assembly has an overall length subdivided into first and second sections provided respectively with first and second contact surfaces.

The actuator assembly is resiliently urged into a rest position at which the first contact surface is in contact with the first stop and the second contact surface is spaced from the second stop by a control distance. The actuator assembly is arranged to reciprocate between its rest position and an advanced position at which the second contact surface is in contact with the second stop and the first contact surface is spaced from the first stop, with the stroke of the actuator assembly and the stroke of the piston being equal to the control distance.

A motor-driven mechanism is arranged to displace one section of the actuator assembly relative to the other section, resulting in a corresponding change to both the overall length of the actuator assembly and the control distance.

Preferred embodiments of pipettes in accordance with the present invention will now be described in greater detail with reference to the accompanying drawings, wherein:

DETAILED DESCRIPTION OF PREFERRED EMBODIMENT

Figure 1:
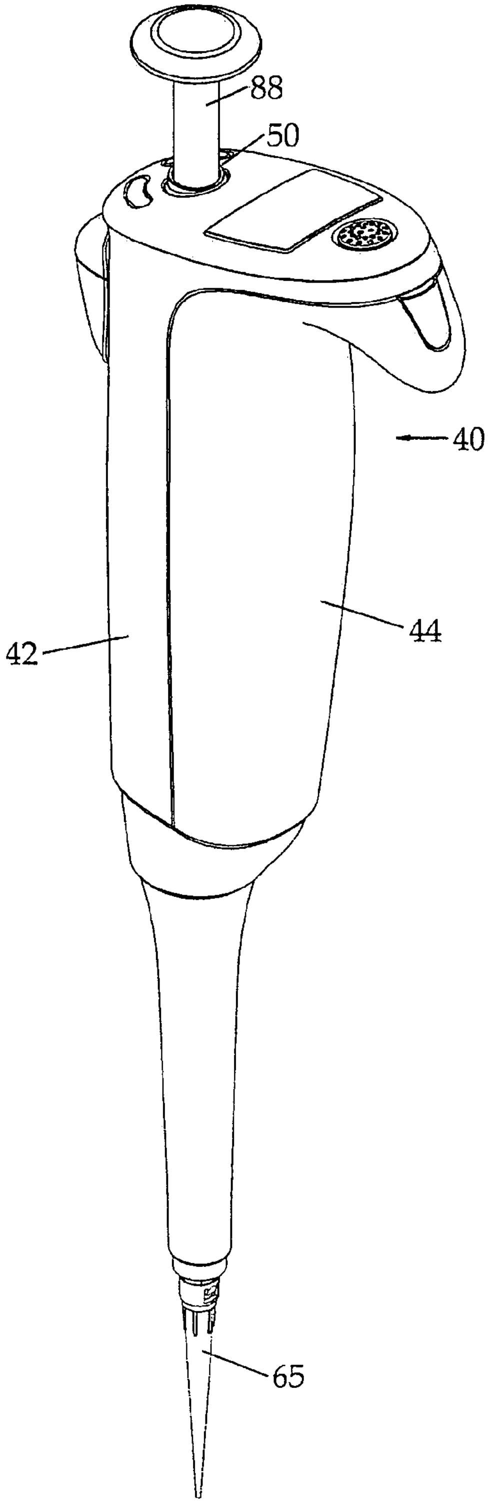
FIG. 1 is a perspective view of a hand-held pipette in accordance with the present invention.
Figure 2:
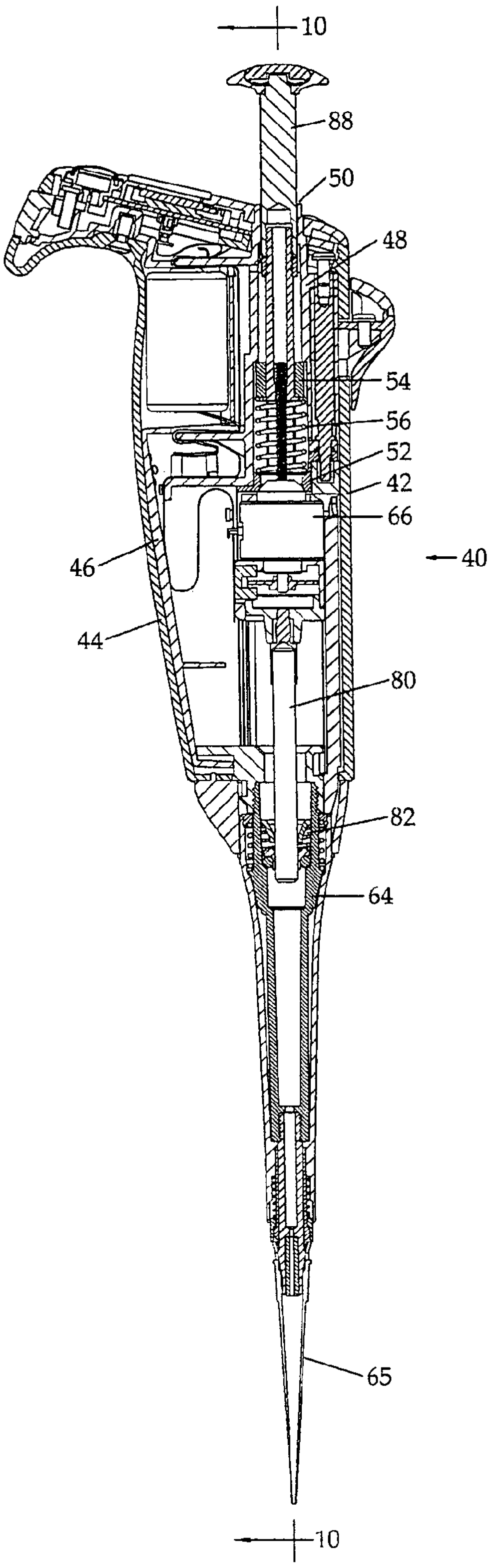
FIG. 2 is a vertical cross sectional view through the pipette, with the length of the actuator assembly adjusted to provide maximum aspiration and fluid dispensing.
Figure 3:
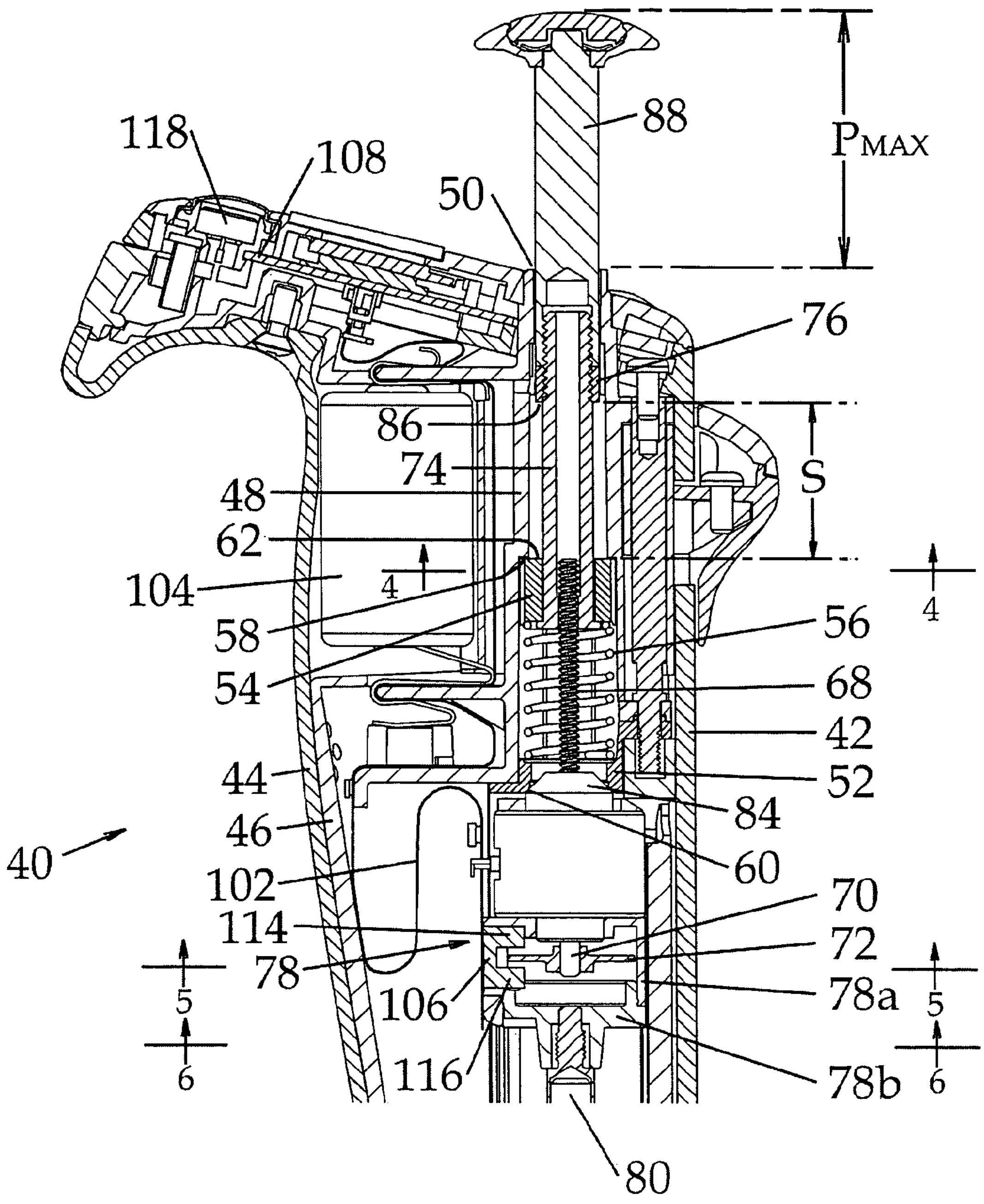
FIG. 3 is an enlarged view of the upper portion of the pipette shown in FIG. 2.

With reference initially to FIGS. 1-6 and 10, a pipette in accordance with the present invention is generally depicted at 40. The pipette includes an outer housing 42 with a detachable cover 44. The housing 42 encloses an interior chassis 46 having a hollow guide 48 leading downwardly from an opening 50 in the top surface of the housing.

A fixed collar 52 is fitted into the bottom end of the hollow guide 48. A floating collar 54 is resiliently urged by a spring 56 against an interior ledge 58 on the hollow guide 48. A tapered interior shoulder on the collar 52 defines a first stop 60, and the upper rim of floating collar 54 defines a second stop 62.

A chamber 64 is aligned axially with the hollow chassis guide 48. The chamber projects downwardly from the lower end of the housing to a distal bottom end configured to releasably hold a detachable pipette tip 65.

An actuator assembly includes the following axially aligned components: a stepper drive motor 66 having an output shaft with a threaded upper end 68 and an oppositely extending bottom end 70 carrying an encoder wheel 72; a tubular sleeve 74 slidably extending through the floating collar 54 into the hollow guide 48, with its upper end externally threaded to receive a reference collar 76 and plunger 88, and its lower end internally threaded to receive the upper end 68 of the motor output shaft; an encoder housing 78 including an upper part 78*a* fixed to the underside of the motor 66, and a lower part 78*b* defining the bottom end of the actuator assembly. A piston 80 has its upper end engaged by the lower part 78*b* of the encoder housing, and its lower end projecting through a seal assembly 82 into the upper end of chamber 64.

Although the piston 80 is shown engaged directly by the bottom end of the actuator assembly, it will be appreciated by those skilled in the art that other means may be provided for establishing a mechanical coupling between these two components. For example, an intermediate linkage might be employed, which would be of advantage in cases where the piston and actuator assembly are not aligned axially.

A tapered nose on motor 66 defines a first contact surface 84, and the lower rim of reference collar 76 defines a second contact surface 86. The actuator assembly may be viewed as being subdivided into a first section comprised of the motor 66 and encoder housing 78, and a second section comprised of the tubular sleeve 74, reference collar 76 and plunger 80, with the two sections being interconnected by the threaded upper end 68 of the motor output shaft.

Figure 10:
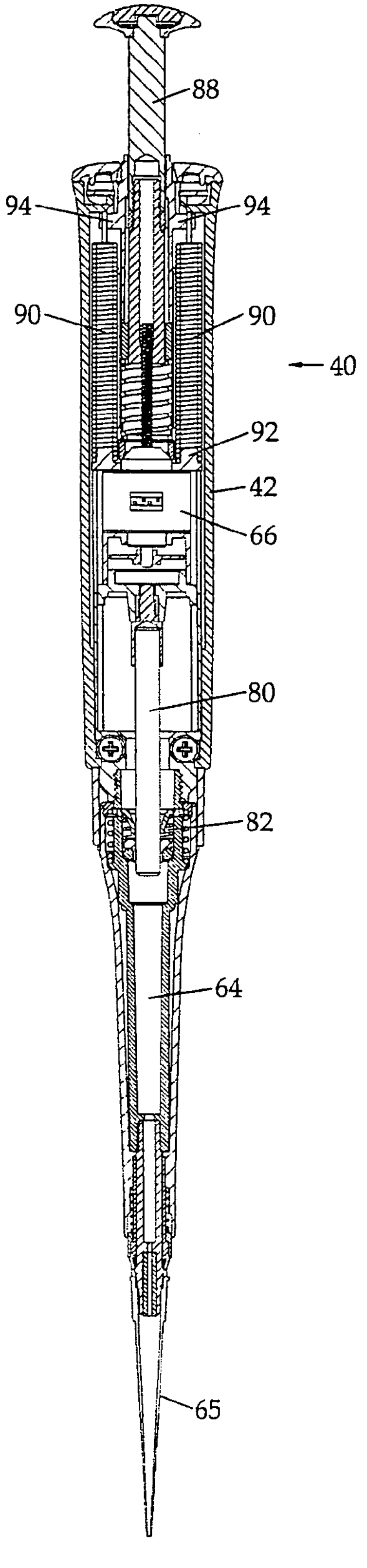
FIG. 10 is a sectional view taken along line 10-10 of FIG. 2.
Figure 11:
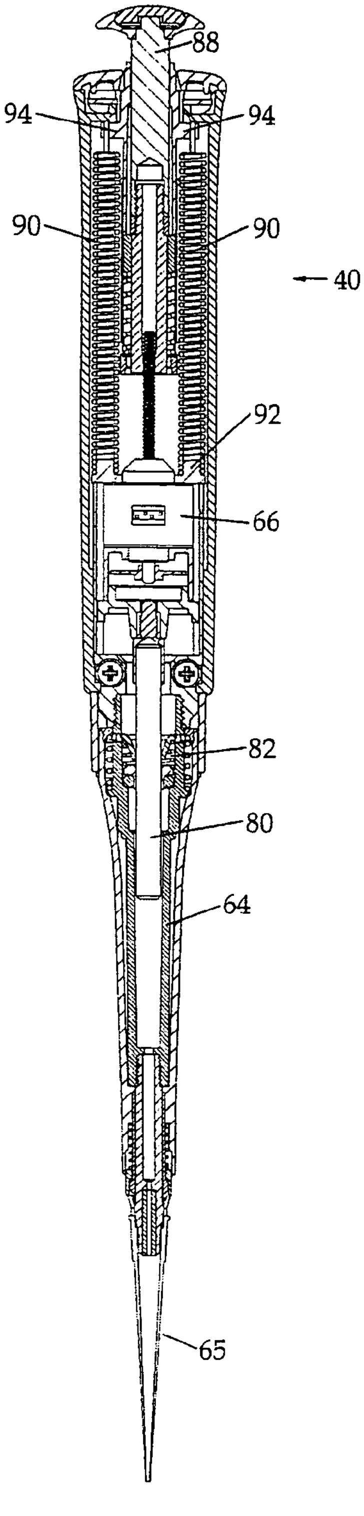
FIG. 11 is a view similar to FIG. 10 showing the plunger fully depressed.

As can best be seen in FIGS. 10 and 11, at least one and preferably two parallel tension springs 90 extend between an anchor plate 92 fixed to the motor 66, and external arms 94 projecting laterally from an upper end of the hollow chassis guide 48. As shown for example in FIGS. 1-3 and 10, the springs 90 serve to resiliently urge the actuator assembly into a "rest" position, at which the first contact surface 84 is in contact with the first stop 60, and the second contact surface 86 is spaced from the second stop 62 by a control distance "S".

Figure 7:
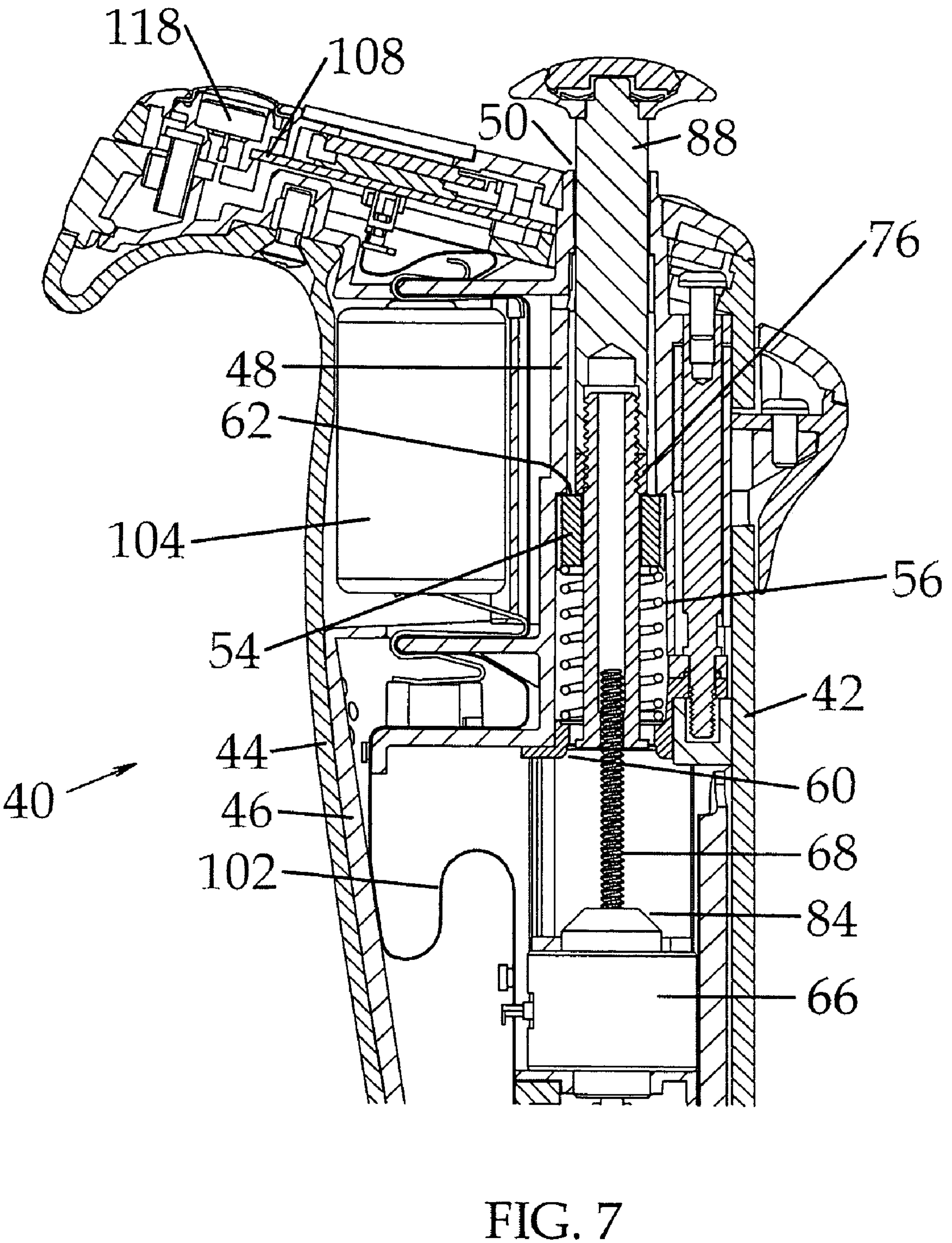
FIGS. 7 and 8 are views similar to FIG. 3 showing the actuator assembly at various stages during its advance in the course of an aspirating and dispensing cycle.

By manually depressing plunger 88, the actuator assembly can be axially shifted against the biasing force of springs 90 from its rest position to a first advanced position as shown in FIGS. 7 and 11, where the second contact surface 86 is in contact with the second stop 62, and the first contact surface 84 is spaced from the first stop 60. The control distance "S" between the second contact surface and the second stop thus defines the stroke of the actuator assembly between its rest and first advanced positions, which also defines the stroke of piston 80.

Fluid may be aspirated into the pipette tip 65 by advancing the actuator assembly to its first advanced position, then submerging the pipette tip into the fluid, and then allowing the actuator assembly to return to its rest position. The thus aspirated fluid may then be dispensed by again advancing the actuator assembly to its first advanced position.

Figure 8:
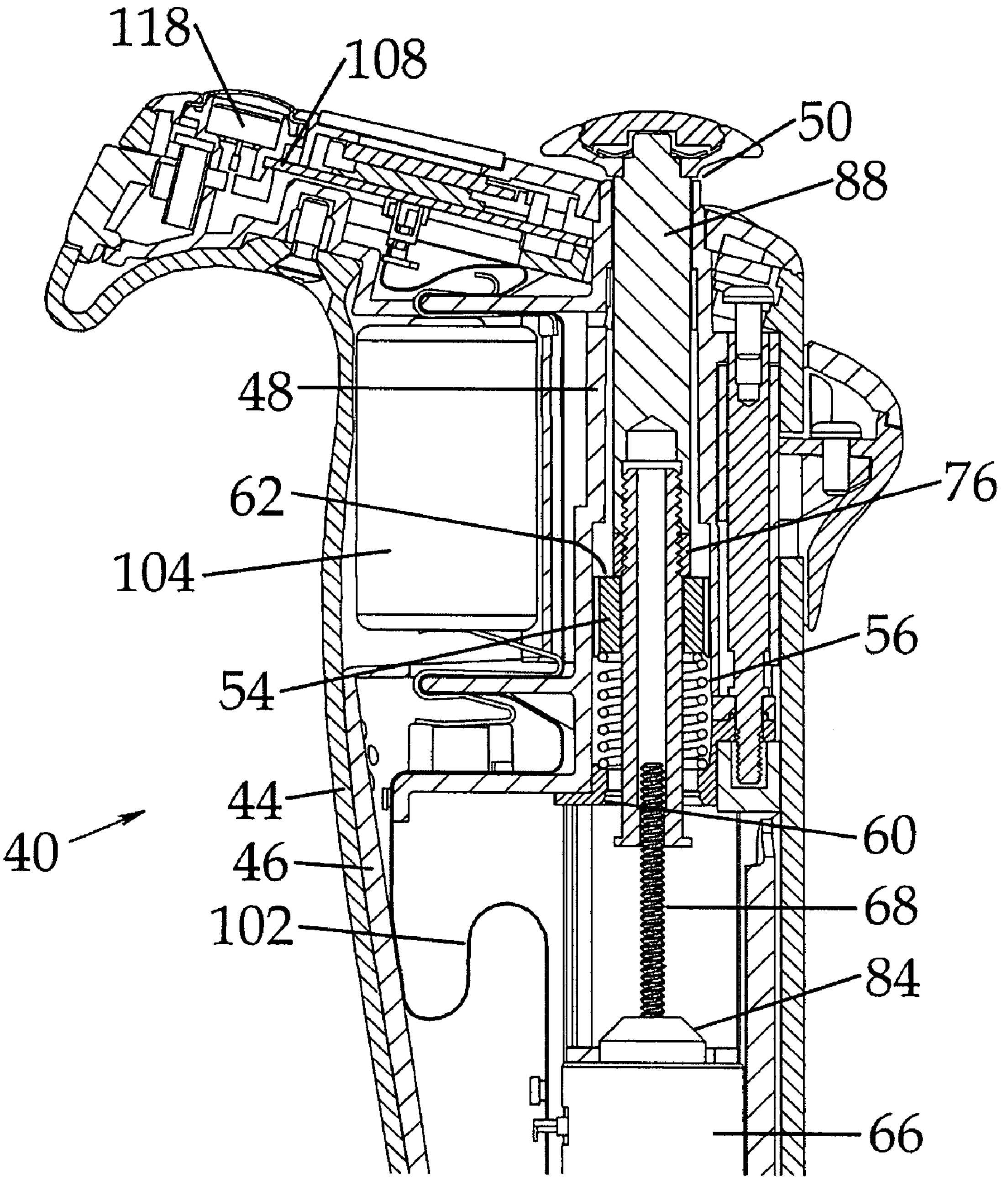

In order to ensure that all of the aspirated fluid has been dispensed, the piston assembly may be further advanced against the biasing action of both spring 56 and springs 90 to a second advanced or "blow out" position as shown in FIG. 8. This will result in the collar 54 being temporarily dislodged axially from the ledge 58 against which it is normally biased by spring 56.

Figure 9:
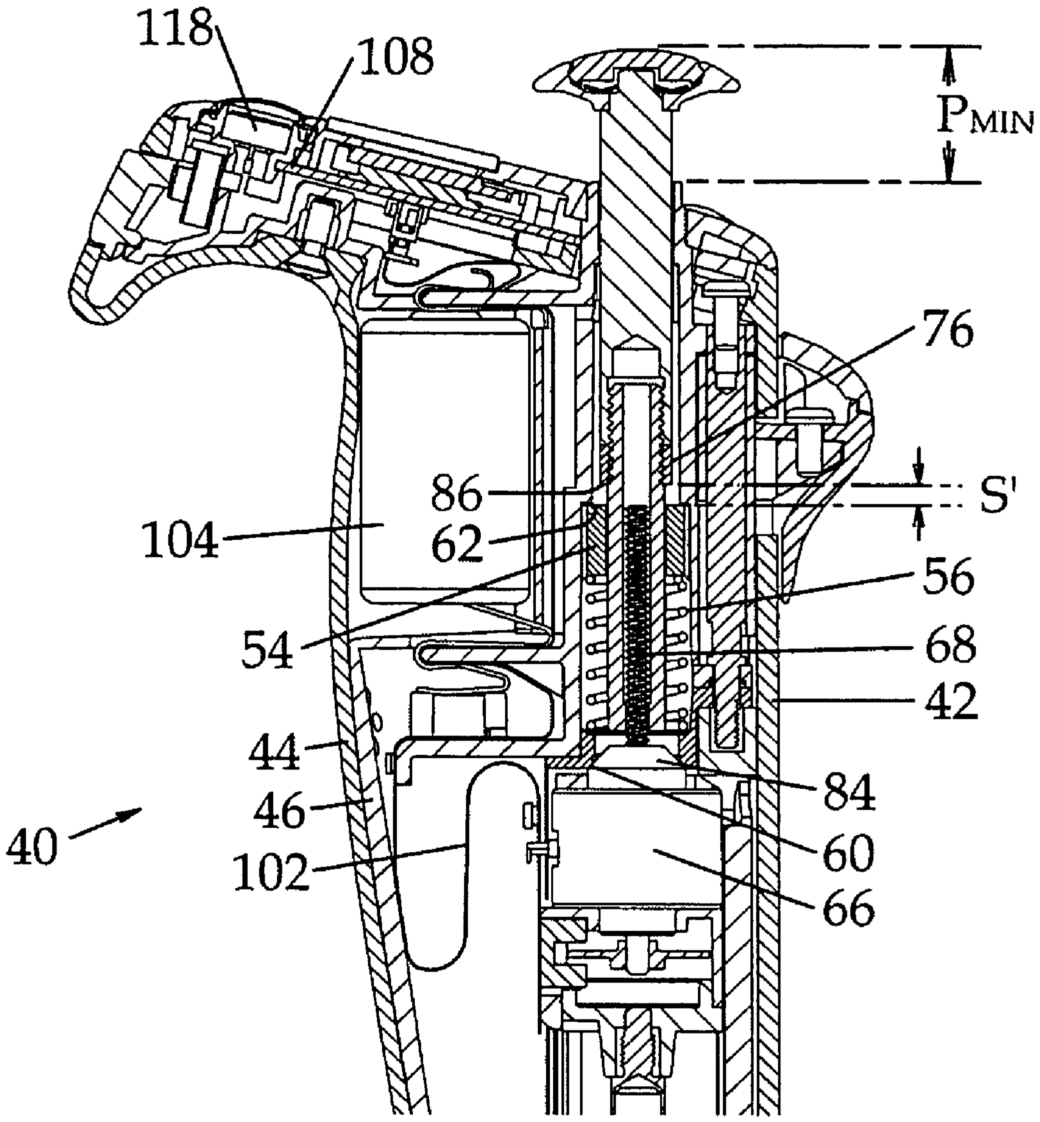
FIG. 9 is another view similar to FIG. 3 showing the length of the actuator assembly adjusted to provide minimum aspiration and fluid dispensing.

The control distance "S" of the actuator assembly may be adjusted automatically by energizing the stepper motor 66 to rotate its output shaft 68 in the appropriate direction. Thus, as shown for example in FIG. 9, the stepper motor may be operated to shorten the overall length of the actuator assembly by retracting the sleeve 74 through the collar 54, thus reducing the distance between the second contact surface 86 and the second stop 62, resulting in a shortened control distance. This adjustment can be made while the collar remains biased against the internal shoulder 58 on guide 48, and without any need to first unload any component from the biasing action of springs 90.

Figure 4:
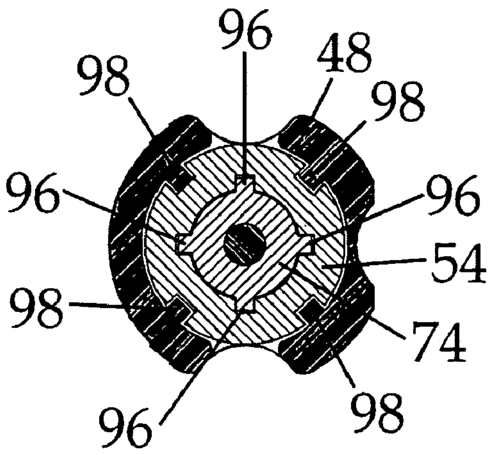
FIG. 4 is a horizontal sectional view taken along line 4-4 of FIG. 3.
Figure 5:
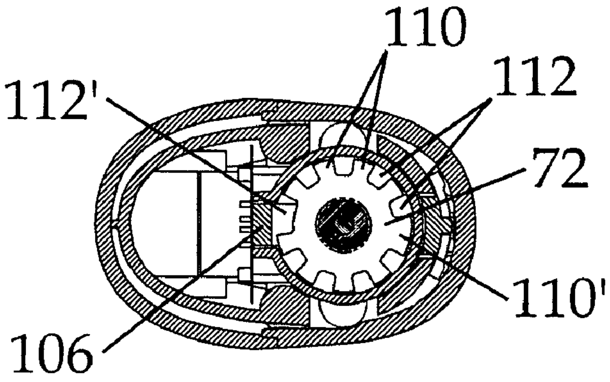
FIG. 5 is a horizontal sectional view taken along line 5-5 of FIG. 3.

As can best be seen in FIG. 4, sleeve 74 has radially outwardly projecting ribs 96 engaged in internal grooves in the collar 54, and the collar in turn has external grooves receiving radially inwardly projecting ribs 98 on the hollow chassis guide 48. This interlocking relationship prevents the sleeve 74 and collar 54 from rotating when the motor 66 is energized, without inhibiting relative axial shifting between the sleeve 74 and collar 54, and between the collar 54 and guide 48.

Figure 6:
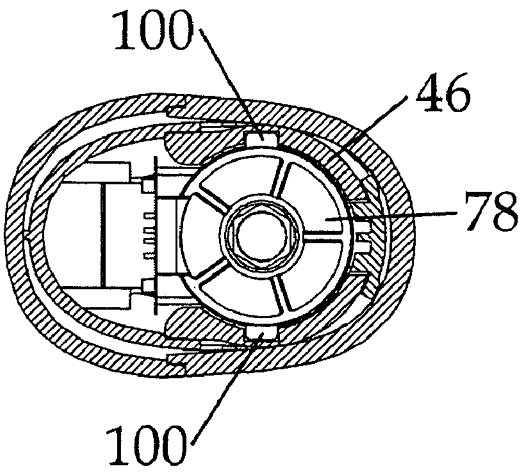
FIG. 6 is a horizontal sectional view taken along line 6-6 of FIG. 3.

As shown in FIG. 6, the encoder housing 78 has radially outwardly projecting ribs 100 received in complimentary grooves in a lower portion of the chassis 46. This interlocked relationship stabilizes the motor 66 against rotation when it is energized to effect adjustments in the length of the actuator assembly.

The motor 66 is connected by a flexible connector 102 to a battery 104 which may be conveniently accessed by removing cover 44. The motor is controlled by a system with a feedback loop which includes the encoder wheel 72 carried by the lower end 70 of the motor output shaft. An optical sensor 106 is connected by connector 102 to a microprocessor on a PC board 108. As can be best seen in FIG. 5, the encoder wheel has radially projecting teeth 110 separated by slots 112. One of teeth 110' has double the width of the others, and is disposed 180° from a double width slot 112'.

The optical sensor includes a light source 114 and a photo cell 116 arranged respectively on opposite sides of the encoder wheel 72. The encoder wheel teeth and slots 110, 112 are aligned between the two sensor elements 114, 116.

With this arrangement, the photocell 116 generates position signals responsive to the light and dark patterns generated by rotation of the encoder wheel 72. The position signals are fed back to the microprocessor. The double width tooth 110' and slot 112' each provide positive reference locations 180° apart. Preferably, the total number of teeth 110 and slots 112 equals the number of steps per revolution of the stepper motor 66, thus making it possible to recognize every step movement of the motor.

The control system will count each step of motor rotation, and will look for the appearance of the double width tooth 110' and slot 112' at expected intervals. Failure of the double width tooth or slot to appear at its expected interval will provide an indication that the pipette is in need of resetting, thereby enabling the control system to correct itself by relocating the respective double width tooth or slot at its expected location.

The stepper motor 66 may be operated in response to command signals input manually on an external key pad, and/or by audible commands received via a microphone 118 and processed by a voice recognition system embodied in the microprocessor.

Figure 12:
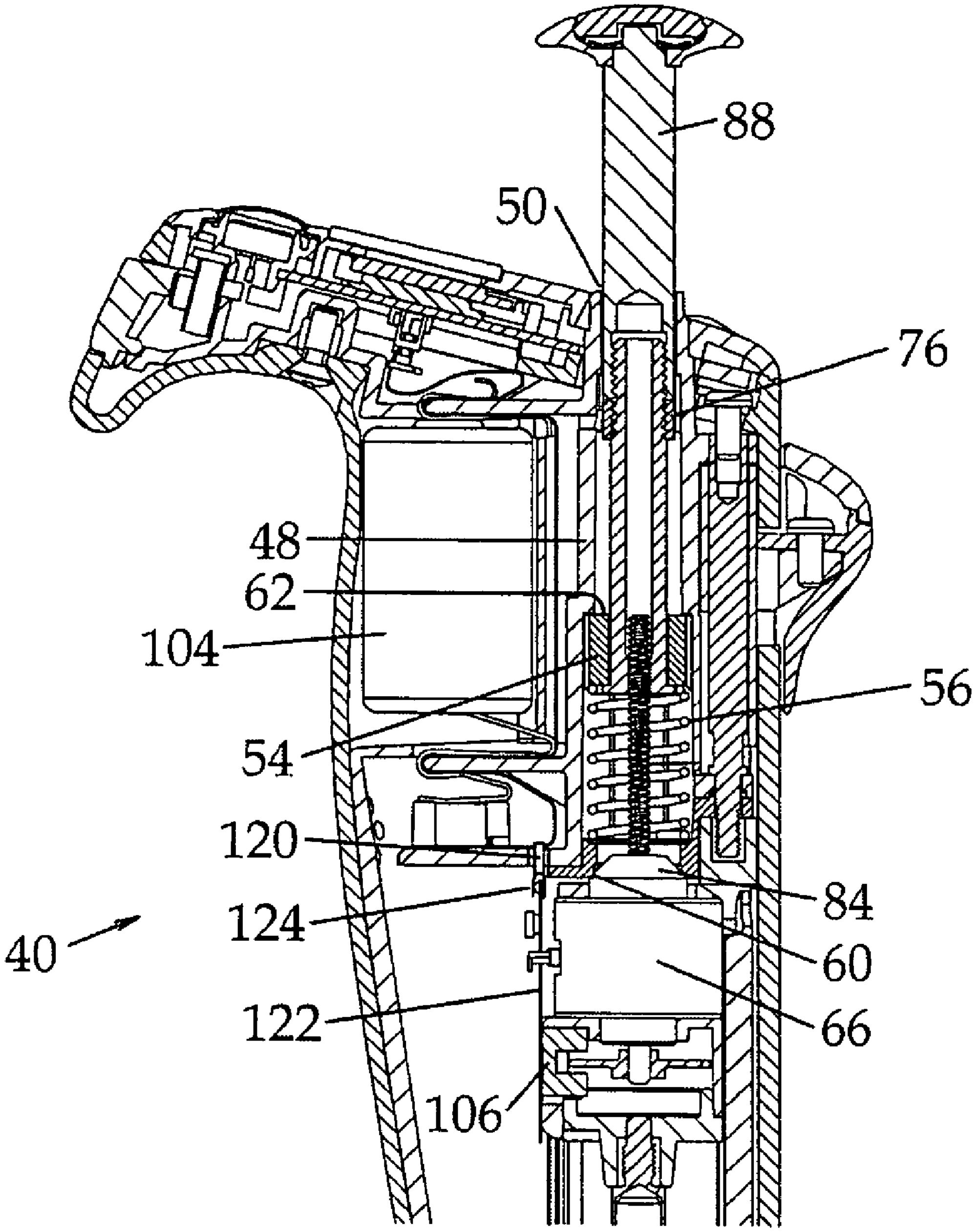
FIGS. 12 and 13 are views similar to FIG. 2 showing an alternative means of electrically connecting the battery to the stroke adjusting motor and optical sensor.
Figure 13:
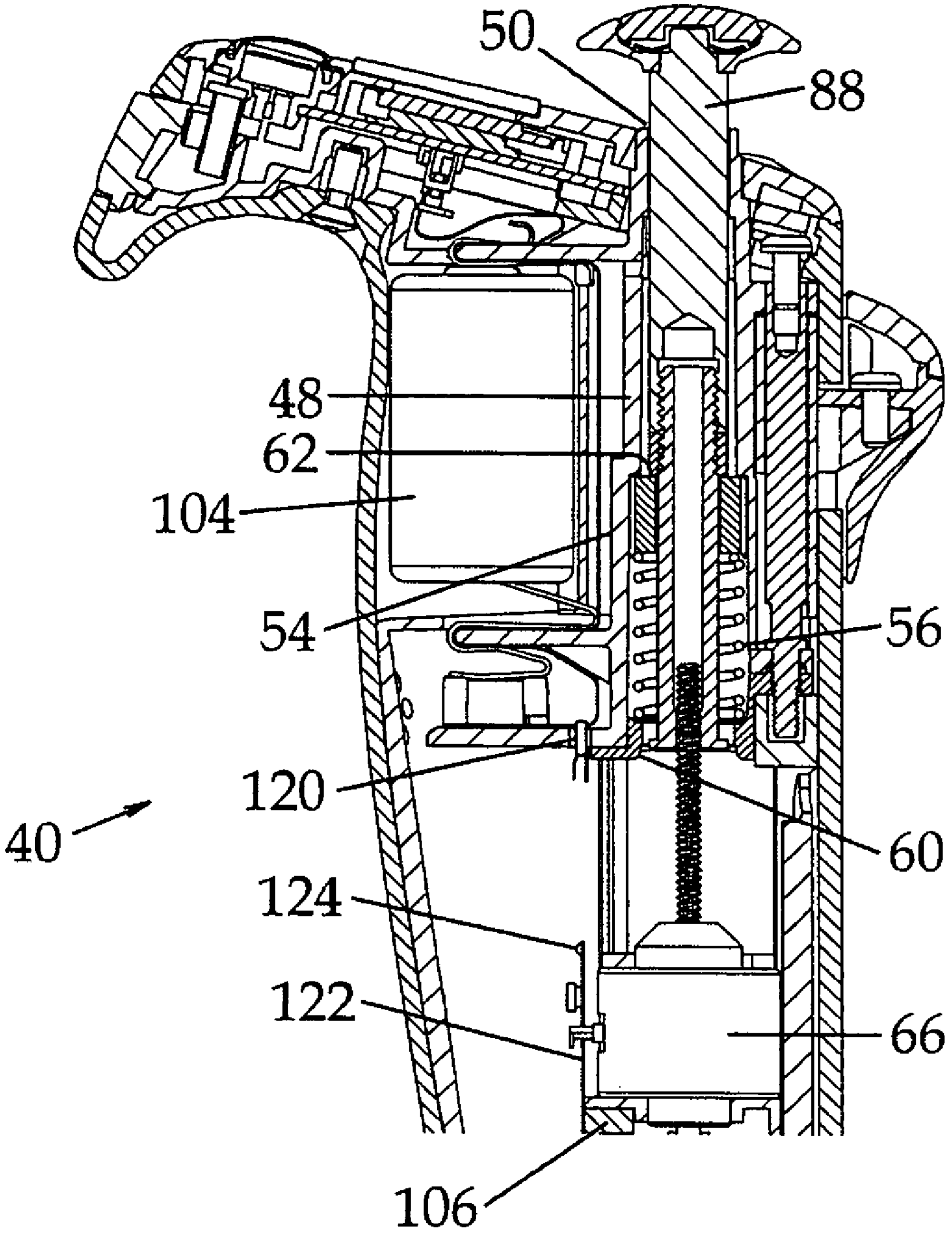

FIGS. 12 and 13 disclose a modified embodiment of the invention in which the lower end of the flexible connector 102 terminates at a fixed bifurcated terminal 120. A contact plate 122 is electrically connected to both the optical sensor 106 and the motor 66. When the piston assembly is in its retracted rest position as shown in FIG. 12, a button 124 at the upper end of contact plate 122 is resiliently and electrically engaged between the bifurcated arms of terminal 120, thus closing the circuit and allowing stroke adjustments to be made.

When the plunger 88 is depressed during an aspirating and dispensing cycle, as shown for example in FIG. 13, the connection between plate 122 and terminal 120 is broken, but this is of no import because stroke adjustments are not made during aspiration and dispensing cycles.

Figure 14:
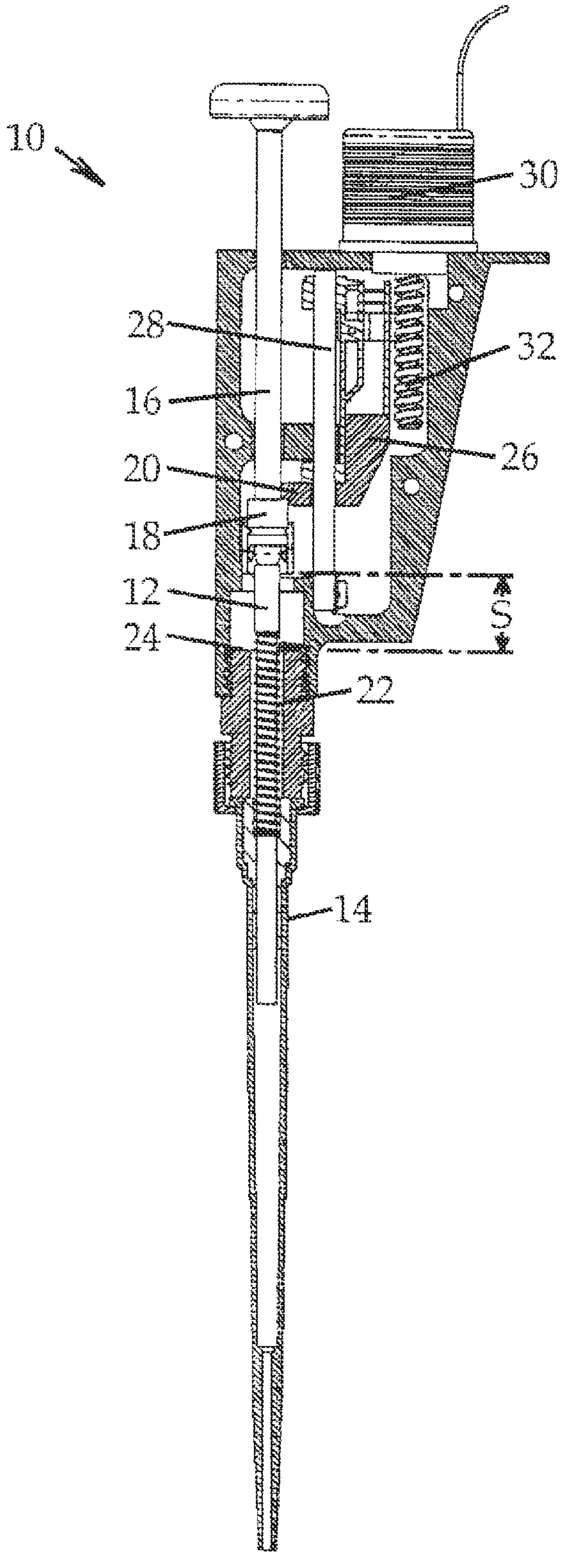
PRIOR ART FIG. 14
FIG. 14 is a sectional view taken through a hand held pipette employing a manually driven piston with a previously developed stroke adjusting mechanism.

In light of the foregoing, it will now be appreciated by those skilled in the art that the present invention provides significant advantages over previously developed pipettes of the type illustrated for example in FIG. 14.

Of particular significance is the departure from stop adjustments in favor of adjustments to the length of the actuator assembly, thus making it possible to effect piston stroke adjustments without first having to relieve the biasing forces being exerted by spring components. Axial alignment of the piston, operating plunger and stepper motor favors compactness, which in turn reduces costs and enhances the ease with which the pipette may be handled and operated by laboratory personnel.

The feedback control system enables precise control and monitoring of stroke adjustments, with the ability to recognize errors and reset itself when necessary.

By shifting the upper section of the actuator assembly in relation to the lower section, with the latter being resiliently retained in the rest position with its first contact surface 84 in contact with the first stop 60, a further advantage is realized in that the magnitude of the resulting stroke can be visually assessed as a function of the extent to which the plunger 88 projects from the top of the housing. Thus, a maximum stroke will be referenced by a maximum plunger projection, as indicated at "$P_{max}$" in FIG. 3, whereas a minimum plunger projection, as indicate at "$P_{min}$" in FIG. 9.

I claim:

1. A hand-held pipette comprising:

a housing provided with a chamber and internal mutually spaced first and second stops;

a pipette tip in fluid communication with said chamber;

a reciprocating piston arranged to coact with said chamber in aspirating and dispensing fluids into and out of said pipette tip;

an actuator assembly for reciprocating said piston, said actuator assembly having an overall length subdivided into first and second sections respectively provided with first and second contact surfaces;

at least one resilient member configured to urge said actuator assembly into a rest position at which said first contact surface is in contact with said first stop and said second contact surface is spaced from said second stop by a control distance, said actuator assembly being arranged to reciprocate between said rest position and an advanced position at which said second contact surface is in contact with said second stop and said first contact surface is spaced from said first stop, the stroke of said actuator assembly and the stroke of said piston being equal to said a control distance; and said actuator assembly including an adjustment mechanism configured to displace one section of said actuator assembly in relation to the other section thereof, said displacement resulting in a corresponding change in both the overall length of said actuator assembly and said control distance.

2. The hand-held pipette of claim 1 wherein the second section of said actuator assembly includes a plunger projecting externally from said housing, and wherein the displacement of one section of said actuator assembly with respect to the other section thereof results in a corresponding change in the extent to which said plunger projects from said housing.

3. The hand-held pipette of claim 1 wherein the first section of said actuator assembly is mechanically coupled to said piston.

4. The hand-held pipette of claim 3 wherein the first and second sections of said actuator assembly and said piston are arranged coaxially.

5. Then hand-held pipette of any one of claims 1-4 wherein said adjustment mechanism comprises an electrically powered motor included as an integral component of one of said sections, and wherein said motor is mechanically coupled to an integral component of the other of said sections.

6. The hand-held pipette of claim 5 wherein said electrically powered motor has an output shaft extending along the length of said actuator assembly, said output shaft providing a connection between said first and second sections.

7. The hand-held pipette of claim 1 wherein said first stop is fixed within said housing, and wherein said at least one resilient member comprises at least one first spring for applying a biasing force to said actuator assembly.

8. The handheld pipette of claim 7 wherein said at least one first spring is in tension.

9. The handheld pipette of claims 7 or 8 further comprising a pair of first springs, wherein said pair of first springs are arranged in parallel.

10. The hand-held pipette of claim 7 wherein said housing includes an internal abutment against which said second stop is resiliently urged by a biasing force exerted by a second spring, said actuator assembly being movable beyond said advanced position in response to an increased operating force of a magnitude sufficient to overcome the biasing forces exerted by both said at least one first spring and said second spring.

11. The hand-held pipette of claims 1, 7 or 10 wherein said first and second stops are defined, respectively, by first and second collars surrounding said actuator assembly.

12. The hand-held pipette of claim 6 wherein said motor is connected by a flexible connector to a battery also contained within said housing.

13. The hand-held pipette of claim 1 wherein said adjustment mechanism comprises an electrically powered stepper motor incorporated as an integral component of one of the sections of said actuator assembly.

14. The hand-held pipette of claim 13 further comprising a control for automatically controlling the operation of said stepper motor in response to command signals.

15. The hand-held pipette of claim 14 wherein said control includes a feedback loop configured to generate position signals indicative of each step of rotation of said stepper motor.

16. The hand-held pipette of claim 14 wherein said control includes an encoder wheel rotatably fixed to an output shaft of said stepper motor, and an optical sensor having a mutually aligned light source and photocell arranged on opposite sides of said encoder wheel, said encoder wheel having peripheral teeth circumferentially spaced by slots, said photocell being operative to generate position signals in response to both exposure to said light source via said slots and isolation from said light source by said teeth.

17. The hand-held pipette of claim 16 wherein at least one of said teeth and slots of said encoder wheel is configured to be different in shape in comparison to said other teeth and slots provided on said encoder wheel.

18. The hand-held pipette of claims 16 or 17 wherein the combined total of said teeth and slots is equal to the rotational steps of said motor.

19. The hand-held pipette of claim 2 wherein the plunger of said second section projects from an upper end of said housing, and said chamber projects from a lower end of said housing.

20. The hand-held pipette of claim 1 wherein said chamber, piston and first and second stops are arranged coaxially.

21. The hand-held pipette of claim 1 wherein said actuator assembly is shiftable in response to an operating force applied to the plunger of said second section.

22. The hand-held pipette of claim 1 wherein said adjustment mechanism further includes a key pad for receiving manual input commands.

23. The hand-held pipette of claim 1 wherein said adjustment mechanism further includes a voice recognition unit for receiving audible input commands.

24. A hand-held pipette comprising:

a pipette tip in fluid communication with a chamber;

a reciprocating piston arranged to coact with said chamber in aspirating and dispensing fluids into and out of said pipette tip;

an actuator assembly for reciprocating said piston, said actuator assembly including a first contact surface that is separated from a second contact surface by an actuator length, said actuator length defining an associated stroke distance of said hand-held pipette; and said actuator assembly including an adjustment mechanism and including a motor and configured to displace one of said first and second contact surfaces of said actuator assembly with respect to the other of said first and second contact surfaces of said actuator assembly to change the actuator length and thereby change the stroke distance of said hand-held pipette.

25. The hand-held pipette as claimed in claim 24, wherein said motor is integrally formed with said actuator assembly.

26. The hand-held pipette as claimed in claim 24, wherein said first contact surface is urged against a first stop within a housing of said hand-held pipette in a rest position of the piston, and said second contact surface contacts a second stop within the housing of the hand-held pipette in an actuated position of the piston.

27. The hand-held pipette as claimed in claim 26, wherein said first contact surface is integrally formed with the motor.

28. The hand-held pipette of claim 24 wherein said adjustment mechanism further includes a key pad for receiving manual input commands.

29. The hand-held pipette of claim 24 wherein said adjustment mechanism further includes a voice recognition unit for receiving audible input commands.

30. A method of using a hand-held pipette, said method comprising the steps of:

providing a pipette tip in fluid communication with a chamber;

reciprocating a piston that is arranged to coact with said chamber in aspirating and dispensing fluids into and out of said pipette tip;

providing an actuator assembly for reciprocating said piston, said actuator assembly including a first contact surface that is separated from a second contact surface by an actuator length, said actuator length defining an associated stroke distance of said hand-held pipette; and activating a motor to displace one of said first and second contact surfaces of said actuator assembly with respect to the other of said first and second contact surfaces of said actuator assembly to change the actuator length from a first actuator length to a second actuator length and thereby change the stroke distance of said hand-held pipette from a first stroke distance to a second stroke distance.

31. The hand-held pipette of claim 5 wherein said electrically powered motor is operable in response to command signals input manually on a key pad located externally on said housing.

32. The hand-held pipette of claim 31 wherein said electrically powered motor is also operable in response to audible commands received via a microphone and processed by a voice recognition system embodied in a microprocessor.

* * * * *

UNITED STATES PATENT AND TRADEMARK OFFICE

CERTIFICATE OF CORRECTION

PATENT NO. : 7,284,454 B2
APPLICATION NO. : 10/855690
DATED : October 23, 2007
INVENTOR(S) : Richard Cote It is certified that error appears in the above-identified patent and that said Letters Patent is hereby corrected as shown below:

In column 4, line 39, change “received in complimentary grooves” to --received in complementary grooves--.

In claim 1, column 6, line 11, change “to said a control distance;” to --to said control distance;--.

In claim 5, column 6, line 31, change “Then hand-held pipette” to --The hand-held pipette--.

Signed and Sealed this

Fifteenth Day of July, 2008

JON W. DUDAS
*Director of the United States Patent and Trademark Office*